United States Patent
Mater et al.

(10) Patent No.: US 8,089,939 B1
(45) Date of Patent: Jan. 3, 2012

(54) PREDICTIVE ROAMING BY A WIRELESS LAN CLIENT STATION

(75) Inventors: Olaf Mater, Eggenstein-Leopoldshafen (DE); Joachim Schmalz, Bischweier (DE)

(73) Assignee: Marvell International Ltd., Hamilton (BM)

(*) Notice: Subject to any disclaimer, the term of this patent is extended or adjusted under 35 U.S.C. 154(b) by 856 days.

(21) Appl. No.: 12/122,278

(22) Filed: May 16, 2008

Related U.S. Application Data

(60) Provisional application No. 60/938,851, filed on May 18, 2007.

(51) Int. Cl.
*H04W 4/00* (2009.01)
(52) U.S. Cl. .......................... 370/332; 370/341; 370/431
(58) Field of Classification Search .................. 370/252, 370/331–338, 341, 401, 431
See application file for complete search history.

(56) References Cited

U.S. PATENT DOCUMENTS

| | | | |
|---|---|---|---|
| 7,103,024 B2* | 9/2006 | Wilson | 370/332 |
| 2008/0076428 A1* | 3/2008 | Jagadeesan et al. | 455/436 |
| 2008/0108352 A1* | 5/2008 | Montemurro et al. | 455/437 |

* cited by examiner

*Primary Examiner* — Phuc Tran

(57) ABSTRACT

The present disclosure provides for a user equipment (UE) for use in a wireless computer network that has multiple wireless access points (APs). The UE can include a wireless transceiver that communicates with the computer network, a link quality assessor that assesses the quality of the communication link between the wireless transceiver and the first selected wireless AP, a link quality forecaster that forecasts a predicted future quality of the communication link as a function of the past quality of the communication link, and an AP switching module that 1) initiates an AP link quality scan to determine a second selected AP when the forecasted link quality falls below a first link quality threshold and 2) switches to the second selected wireless AP when the forecasted link quality falls below a second link quality threshold.

38 Claims, 6 Drawing Sheets

| AP RANK | AP IDENTIFIER | LINK QUALITY | FIRST THRESHOLD | SECOND THRESHOLD |
|---|---|---|---|---|
| 1 | 101 | 98% | 40% | 25% |
| 2 | 52 | 94% | 50% | 33% |
| 3 | 171 | 45% | 50% | 33% |
| 4 | 222 | 17% | 40% | 25% |

PREDICTIVE ROAMING BY A WIRELESS LAN CLIENT STATION

INCORPORATION BY REFERENCE

This application claims the benefit of U.S. Provisional Application No. 60/938,851, "Link Quality Forecast" filed on May 18, 2007, which is incorporated herein by reference in its entirety.

BACKGROUND

A client station (STA) can operate in a wireless local area network (WLAN) by communicating with an access point (AP). The communication signals between the STA and the AP can include an uplink and a downlink signal. The downlink signal from the AP may also be called the link signal, or simply, the link. The quality of the uplink and downlink signals may vary with time, STA position with respect to the currently selected AP, weather, and other factors.

The STA may supplant the current AP with a new AP as needed. The act of switching to communicate with a new AP may be called roaming. Roaming in WLAN STAs may be distinguished from network roaming in cellular networks in which a user equipment (UE), such as a cellular telephone, can select and communicate with either a new base station (BS) within a current cellular network or a new cellular network. In a cellular network, the BS may assist or command the UE to roam to a new base station.

In a WLAN, an STA may roam without receiving assistance or roaming commands from the AP. An STA may prepare to roam by scanning the link signals from candidate APs. The STA may scan the links while performing other tasks, such as uplinking a signal, updating internal information, or executing other tasks. The STA may roam to a new AP based on the scan, albeit with some latency. The STA may also periodically scan during normal operations. The periodic scanning process can be called background scanning. Background scanning can prepare the STA to roam to a new AP quickly.

Background scanning can consume STA resources and can reduce the throughput or information transfer rate between the STA and the currently selected AP. The demand on STA resources, throughput reduction, and other performance costs can depend on the duration of each scan, the frequency of scans, the probability that a new AP actually offers a better link signal, and other factors.

SUMMARY

The present disclosure provides for a user equipment (UE) for use in a wireless computer network that has multiple wireless access points (APs). The UE can include a wireless transceiver that communicates with the computer network, a link quality assessor that assesses the quality of the communication link between the wireless transceiver and the first selected wireless AP, a link quality forecaster that forecasts a predicted future quality of the communication link as a function of the past quality of the communication link, and an AP switching module that initiates an AP link quality scan to determine a second selected AP when the forecasted link quality falls below a first link quality threshold. Additionally or alternatively, the AP switching module switches to the second selected wireless AP when the forecasted link quality falls below a second link quality threshold.

The present disclosure describes a method of roaming in a wireless computer network having a plurality of wireless access points. The method can include communicating with the computer network through a first selected wireless access point, assessing the quality of a communication link between the wireless transceiver and the first selected wireless access point, forecasting the predicted future quality of the communication link as a function of past quality of the communication link, scanning the access points to identify a second selected access point for communication with the computer network when the forecasted link quality falls below a first link quality threshold. Additionally or alternatively, the method can include and switching to the second selected wireless access point when to the forecasted link quality falls below a second link quality threshold.

The disclosure describes a method for roaming by a client station of a wireless local area network (WLAN). The method can measure multiple link quality values for a downlink signal received by the client station. The downlink signal may be transmitted from a WLAN AP. The method can include forecasting the predicted future link quality with a predictor in the client station. The predictor can base the predicted future link quality estimate on the measured link quality values and switch to another AP based on the future link quality estimate.

The disclosure describes a method for roaming in a WLAN in which a scanning and a roaming threshold are set to determine when the client station will increase the scanning frequency and begin to roam, respectively. The method can also include 1) measuring multiple current link quality values of the downlink signal from a current AP, 2) switching to a new AP when a link quality value is below the roaming threshold, 3) forecasting a predicted future link quality based on current link quality values, 4) comparing the predicted future link quality to the scanning threshold or the roaming threshold, 5) decreasing the time span until the next scan if the predicted future link quality is below the scanning threshold, and 6) scanning immediately when the predicted future link quality is below the roaming threshold.

The disclosure includes a method for roaming by a client station in a WLAN that can includes scanning for an AP in the WLAN, updating database of APs with the measured link quality of each AP found in the scan, predicting the link quality of the current AP at a future time, selecting a new AP when the predicted future link quality is less than a roaming threshold, and adjusting the next scan time when the predicted future link quality is less than a scanning threshold but greater than the roaming threshold.

The disclosure can provide for a client station in a WLAN. The client station includes a radio frequency (RF) receiver that receives a downlink signal from an AP of the WLAN and measures multiple link quality values of the downlink signal. The client station can also include 1) a link quality predictor that forecasts the predicted future link quality based on the multiple link quality values, 2) a threshold comparator that compares the predicted future link quality with a scanning threshold and a roaming threshold, which is less than the scanning threshold, 3) a scan adjuster that delays the scan schedule when the predicted future link quality is above the scanning threshold and accelerates the scan schedule when the predicted future link quality less than or equal to the scanning threshold but above the roaming threshold, and 4) a controller that commands the receiver to switch to an alternate AP when the predicted future link quality or the link quality values are less than or equal to the roaming threshold.

BRIEF DESCRIPTION OF THE DRAWINGS

The disclosure will make reference to the accompanying figures, wherein like numerals represent like elements, and wherein.

DETAILED DESCRIPTION OF EMBODIMENTS

Figure 1:
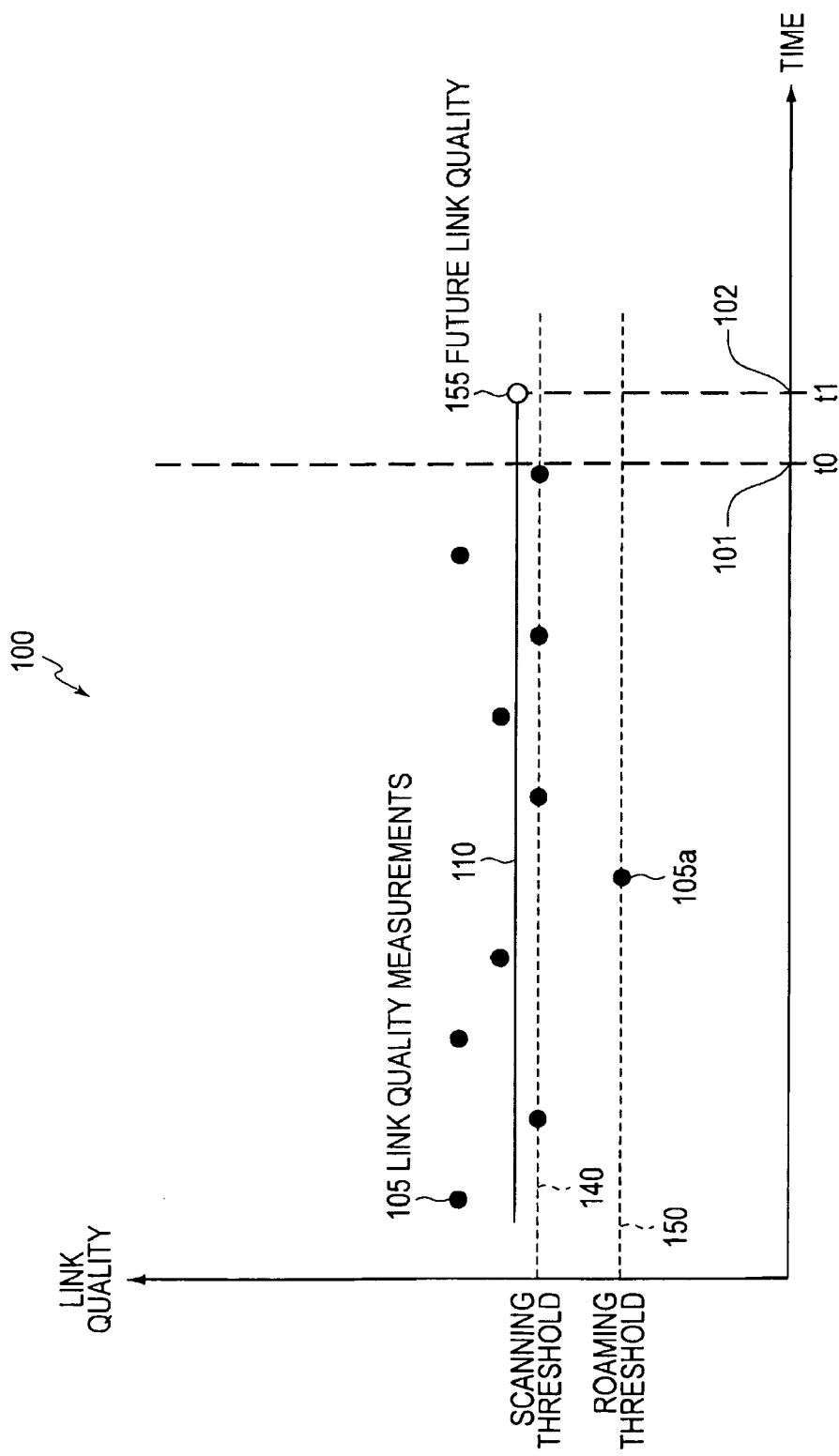
FIG. 1 shows a diagram of a link quality history and forecast for non-decreasing link quality in accordance with an embodiment.

FIG. 1 shows a diagram of a link quality history and forecast in accordance with an embodiment of the disclosure for non-decreasing link quality 100 that includes multiple link quality measurements 105, denoted by filled circles, a link quality model 110, a scanning threshold 140, a roaming threshold 150, a current time 101, denoted $t_0$, a future time 102, denoted $t_1$, and a predicted future link quality 155, denoted by an open circle. The link quality model 110, may be based on a history of link quality measurements and may be extrapolated beyond the current time 101 to the future time 102 to predict or forecast the future link quality 155.

The future link quality 155 may indicate that quality of the link signal is likely to remain at or above the scanning threshold 140. As a result, the client station (STA), which may also be described as a user equipment (UE), may continue to receive a downlink from the current access point (AP) rather than roam to or switch to a new AP. The STA may scan, i.e., check links from candidate APs, infrequently when the link quality from the current AP is forecasted to remain steady or increase even if a single link quality measurement falls below scan threshold 140. The UE may continue to scan infrequently unless a link quality measurement 105 falls below a roaming threshold 150 as discussed with respect to roaming threshold 250 in FIG. 2. It should be noted that a link quality measurement, such as link quality measurement 105a, that does not fall below the roaming threshold 150 may or may not cause the future link quality 155 to fall below the scanning threshold 140.

Figure 2:
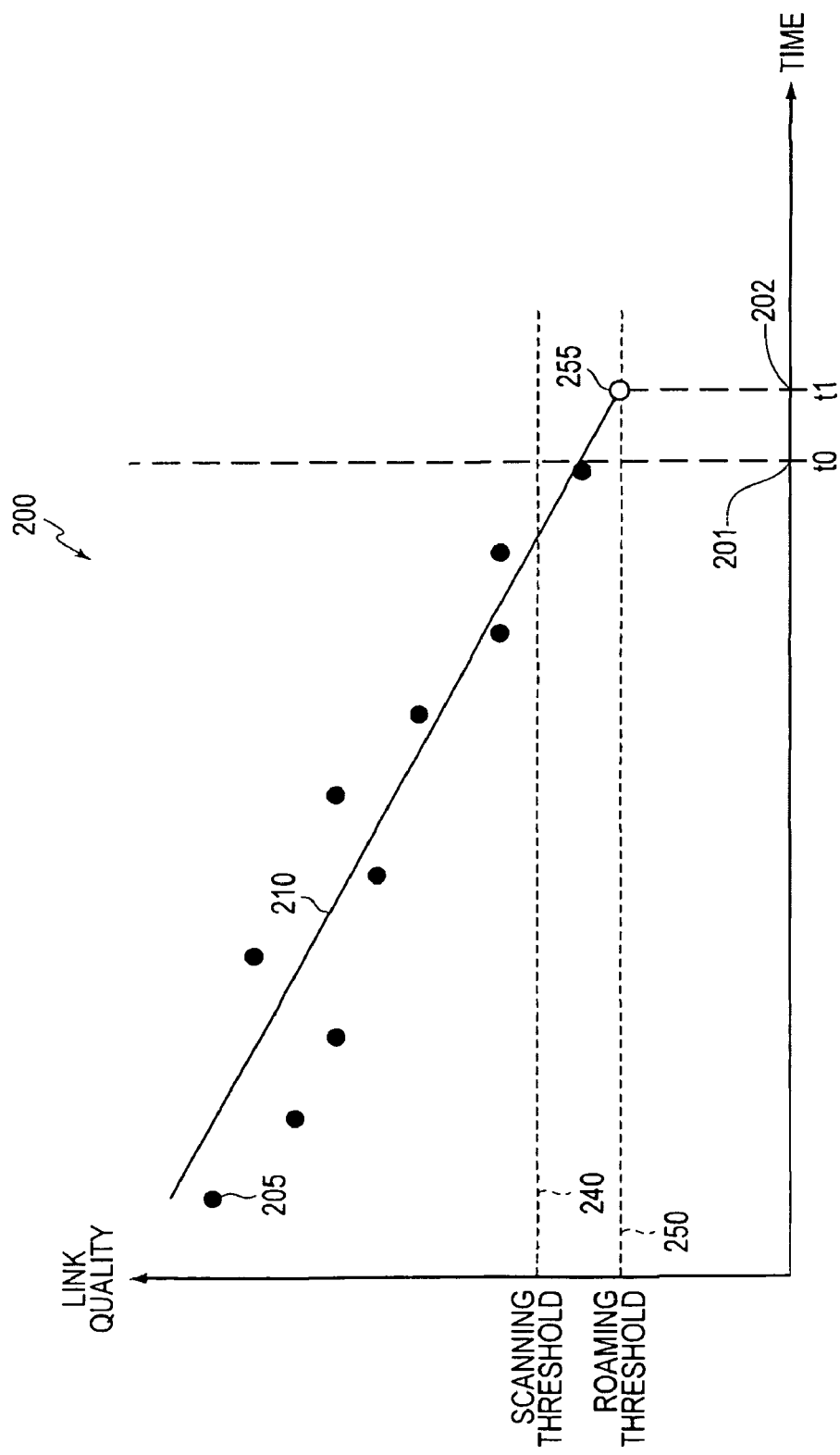
FIG. 2 shows a diagram of a link quality history and forecast for decreasing link quality in accordance with another embodiment.

FIG. 2 shows a diagram of a link quality history and forecast in accordance with an embodiment of the disclosure for decreasing link quality 200 that includes a multiple link quality measurements 205, denoted by filled circles, a link quality model 210, a predicted future link quality 255, denoted by an open circle, a current time 201, denoted by $t_0$, and a future time 202, denoted by $t_1$, a scanning threshold 240, and a roaming threshold 250.

The future time 202 can be selected to provide a pre-trigger or advance warning of a drop in signal quality. For example, the future time 202 can differ from the current time 201 by between a few tenths of a second to hundreds of seconds. In other words, the future time 202 may be selected to provide a short-term forecast or a long-term forecast of link quality. A short-term forecast may be desirable when the link quality model 210 predicts that the link quality is likely to degrade rapidly. The period of the future time 202 may be dynamically adaptable in the sense that it may be determined as a function of a rate of change of link quality.

The link quality model 210 may decrease the inter-scan interval, i.e., the time between scans, when the rate of link quality degradation is high. In other words, the future time 202 can be adjusted based on the link quality measurements 205. In a steady state, such as when the link quality measurements 205 remain above the scanning threshold 240, the link quality model 210 may eliminate scans or increase the inter-scan interval to save power or other resources.

The future time 202 may also be based on a forecasted slope of the link quality model 210 and may indicate that a threshold crossing, such as a crossing of scanning threshold 240 or roaming threshold 250, may occur within a predefined time interval. The time difference between the future time 202 and the current time 201 may be called a time-to-go (TTG). A controller, such as the controller described with respect to FIG. 7, can compute an updated scanning frequency or can reschedule a next scan time based on the TTG. For example, if the TTG is greater than 10 seconds, the controller, such as the controller described with respect to FIG. 7, can maintain a pre-existing or default scanning frequency.

The slope of the link quality model 210 can become negative when the link quality degrades and may indicate that the predicted link quality is likely to drop below the roaming threshold 250 at a future time 202. If the predicted link quality drop to or below the roaming threshold 250, the STA can enter a scanning mode or can update a next scan time based on the future link quality 255. By basing entry into a scan mode on a prediction, an STA can save energy and/or other resources by not scanning until needed, or by scanning in due time to ensure reduced latency when roaming is required.

Figure 3:
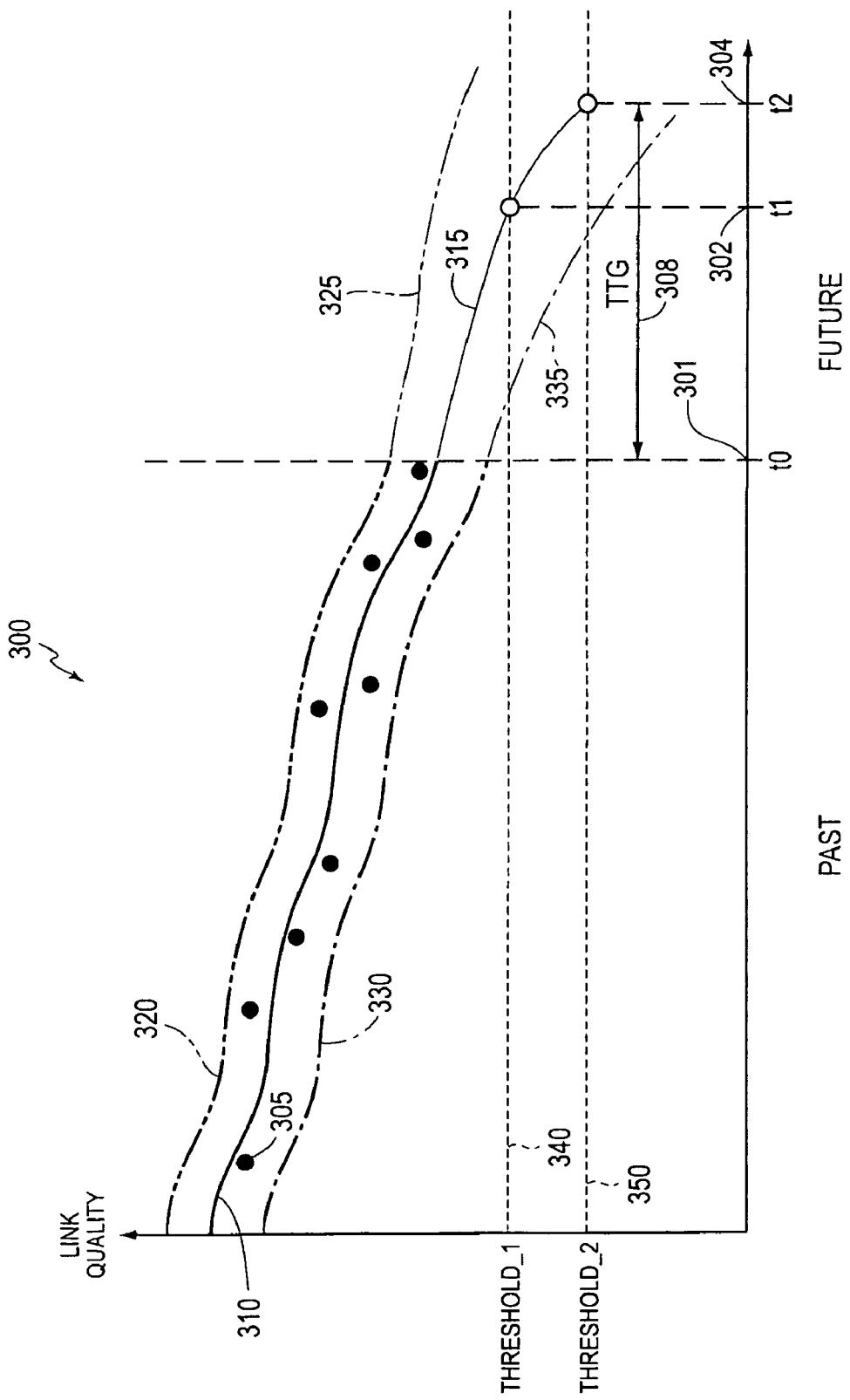
FIG. 3 shows a diagram of a link quality history and forecast with centroid and extent in accordance with another embodiment.

FIG. 3 shows a diagram of a link quality history and forecast with centroid and extent 300 in accordance with an embodiment of the disclosure that includes multiple link quality measurements 305, a link quality model 310, a link quality upper extent 320, and a link quality lower extent 330, a current time instant 301. FIG. 3 also shows an example of a forecasted link quality 315, a forecasted link quality upper extent 325, a forecasted link quality lower extent 335, a first threshold 340, a second threshold 350, a first future time 302, and a second future time 304. The second future time 304 may be called the intercept time. The difference between the second future time 304 and the current time instant 301 can equal the time-to-go (TTG) 308.

Figure 7:
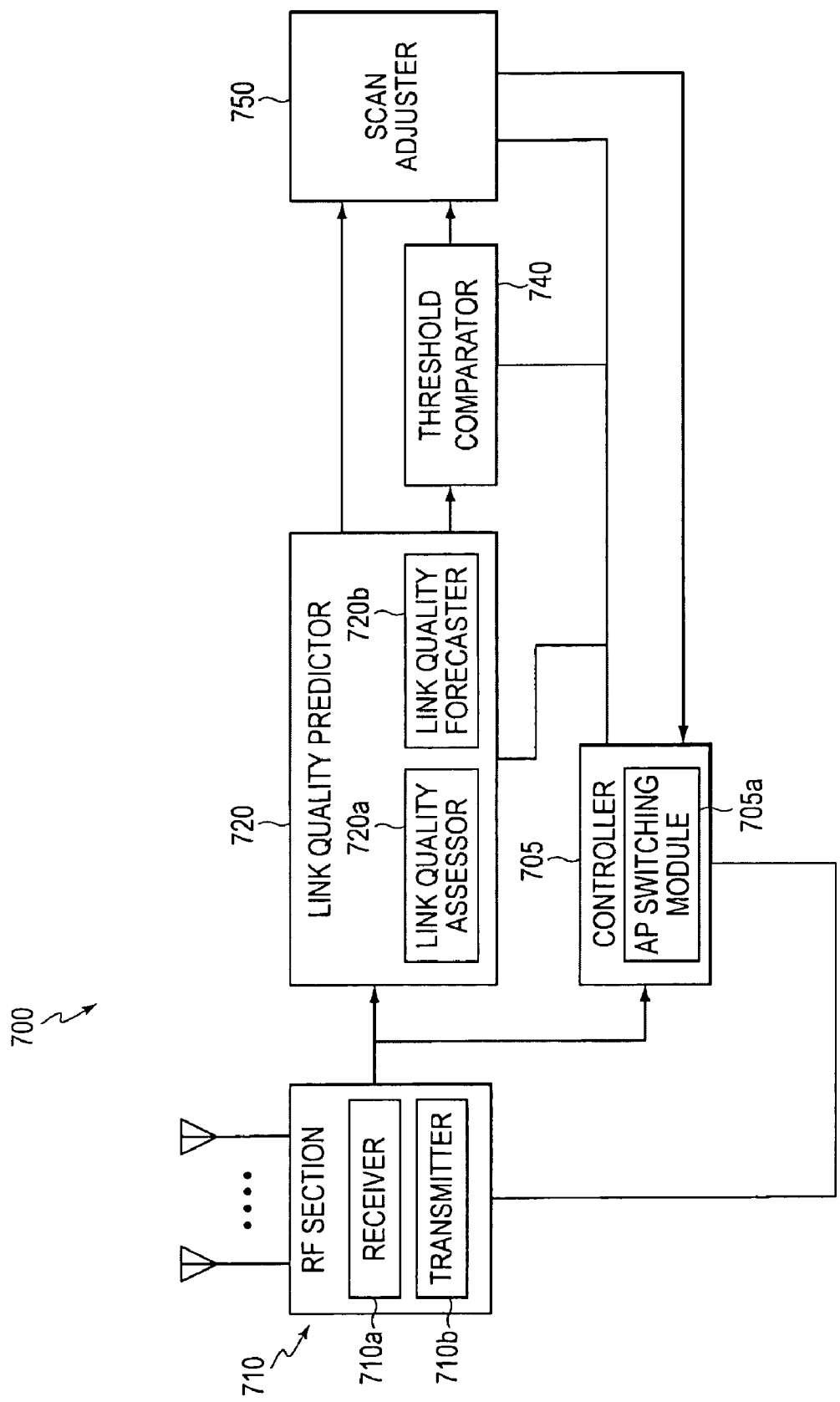
FIG. 7 shows a diagram of a unilaterally predictive roaming device in accordance with an embodiment.

The link quality model 310 can be determined by a link quality predictor, such as the link quality predictor 720 described with respect to FIG. 7. The link quality predictor may extrapolate a linear model, an auto-regressive model, a linear predictive model, a linear regression model, a polynomial regression, and the like, or propagate an estimator, such as a Kalman model. The link quality model 310 and link quality upper and lower extent 320 and 330, may be forecast to determine a range of likely or probable link quality values that lie in a band between the upper link quality extent 320 and the lower link quality extent 330. For example, a Kalman estimator can track the mean and the variance in link quality and can equate the link quality upper extent 320 to the mean plus a standard deviation and the lower link quality bound 330 to the mean minus a standard deviation. In other words, a state estimator or a link quality estimator can extrapolate or forecast both the mean value of link quality as well as an upper and lower extent of link quality. Taken together, the link quality model 310 and link quality extents 320 and 330 can quantify statistical measures of central tendency and dispersion of link quality.

The examples of link quality history and forecasts shown in FIGS. 1 and 2 may be better illustrated by describing and tabulating several scenarios for unilaterally predictive roaming of an STA. Unilaterally predictive roaming may be described as a roaming strategy in which the STA does not require the assistance or commands from an AP to switch to a new AP. In unilaterally predictive roaming, an STA may roam a new AP when the STA's background scan reveals the link quality of the new AP is more favorable than that of the current AP.

The link quality may be measured using a standard quality metric or a combination of metrics. For example, the link quality may be measured in terms of the link received signal strength indication (RSSI), a link signal-to-noise ratio (SNR), a link signal-to-interference ratio (SIR), a bit error rate (BER), and the like. The link quality may also be measured in terms of the likelihood that roaming to a new AP can yield a sustainable link without additional or frequent background scanning, roaming back to the current AP, and the like. In other words, the link quality may be transformed to a decision metric with a predetermined statistical receiver-operating curve (ROC). The ROC may be selected to trade-off statistical Type I (false alarm) and Type II (missed detection or false negative) decision errors.

The process of selecting a new AP or remaining linked to the current AP can be called a roaming decision. When preparing to make a roaming decision, the STA can perform a background scan first, then update a database of candidate APs. The STA can measure or calculate the link quality for the candidate APs, which may include the current AP, update a database with the link quality data, and select a new AP based on the updated database.

Table 1 provides an example of a set of responses of a unilaterally predictive roaming device to a change in link quality for a current AP, in accordance with an embodiment of the disclosure.

TABLE 1

| STA scenarios when current link quality decreases | | | |
|---|---|---|---|
| | Scenario #1 | Scenario #2 | Scenario #3 |
| Stimulus | There is sudden drop in link quality to below the roaming threshold. | There is a slow decrease in link quality; link quality is likely to remain above the scanning threshold. | There is a rapid decrease in link quality; link quality is likely to fall below the scanning threshold. |
| STA Response | STA can immediately roam to a new AP or may select a candidate AP from a previous scan. | STA can increase the rate of background scans for AP signals and can update the AP database more frequently. | STA can increase the rate of background scans for AP signals, update the AP database, and switch to a selected AP. |
| Possible Consequence | there may be some latency in reconnecting due to the duration of a scan. | a false negative (Type II error) decision to remain with the current AP. | a false positive (Type I error) decision to switch to a new AP. |

In scenario #1, the link quality can fall rapidly to below a roaming threshold and the STA can switch to a new AP immediately. The new AP may be selected from a pre-tabulated list or database of candidate APs. In scenario #2 and #3, the STA may periodically scan the links for candidate APs, update the AP database with AP identifiers and corresponding link quality, and can vary the background scanning rate based on the link quality of the current AP signal. In other words, the STA can adjust the scan rate or next scan time as a function of current link quality and/or a forecast degradation in link quality.

The STA can respond to changes in current link quality using AP selection or roaming strategies that optimize a performance metric, such as maximizing a prospective throughput, minimizing a probability that a loss of signal (LOS) can occur, minimizing a prospective BER, and the like. For example, the STA may maximize the aggregate data throughput of a voice over Internet protocol (VoIP) signal that is transmitted to the STA from the current AP and a new AP. In other words, VoIP data throughput may be protected or maximized using a roaming loss minimizer, switchover loss minimizer, or optimized performance metric. The optimized performance metric may use variables, such as the rate of change of link quality, and higher time derivatives of link quality, as well as the link quality level. It is worth noting that the projected data throughput may decrease if the scanning mode is invoked repeatedly or shortly after the STA roams to a new AP.

The STA can begin to scan and roam immediately when the current link quality is at or below a roaming threshold. When the current link quality is above the roaming threshold, the STA background scanning may perform on either a normal schedule or an accelerated schedule to find the average link quality. The average link quality can yield a forecasted link quality that is used to make an earlier, timely roaming decision. In other words, the STA may switch to a candidate AP based on a predicted link quality before the STA reaches the roaming threshold, thereby reducing latency. The disclosed roaming method can be described as unassisted or unilateral predictive roaming based on link quality trending or forecasting. The present disclosure may be contrasted with roaming in a cellular network, i.e., WLANs may not follow the same roaming procedures as cell phones. For example, a cell phone can cooperate with the base station (BS) to make a roaming decision or can receive a roaming instruction from a BS or a network.

Link quality can be derived from signal strength or a function of other signal parameters. The signal strength measurement may be obtained from the receiver in the STA. The link quality may also be obtained as a function of SNR, SIR, BER, and the like.

Figure 4:
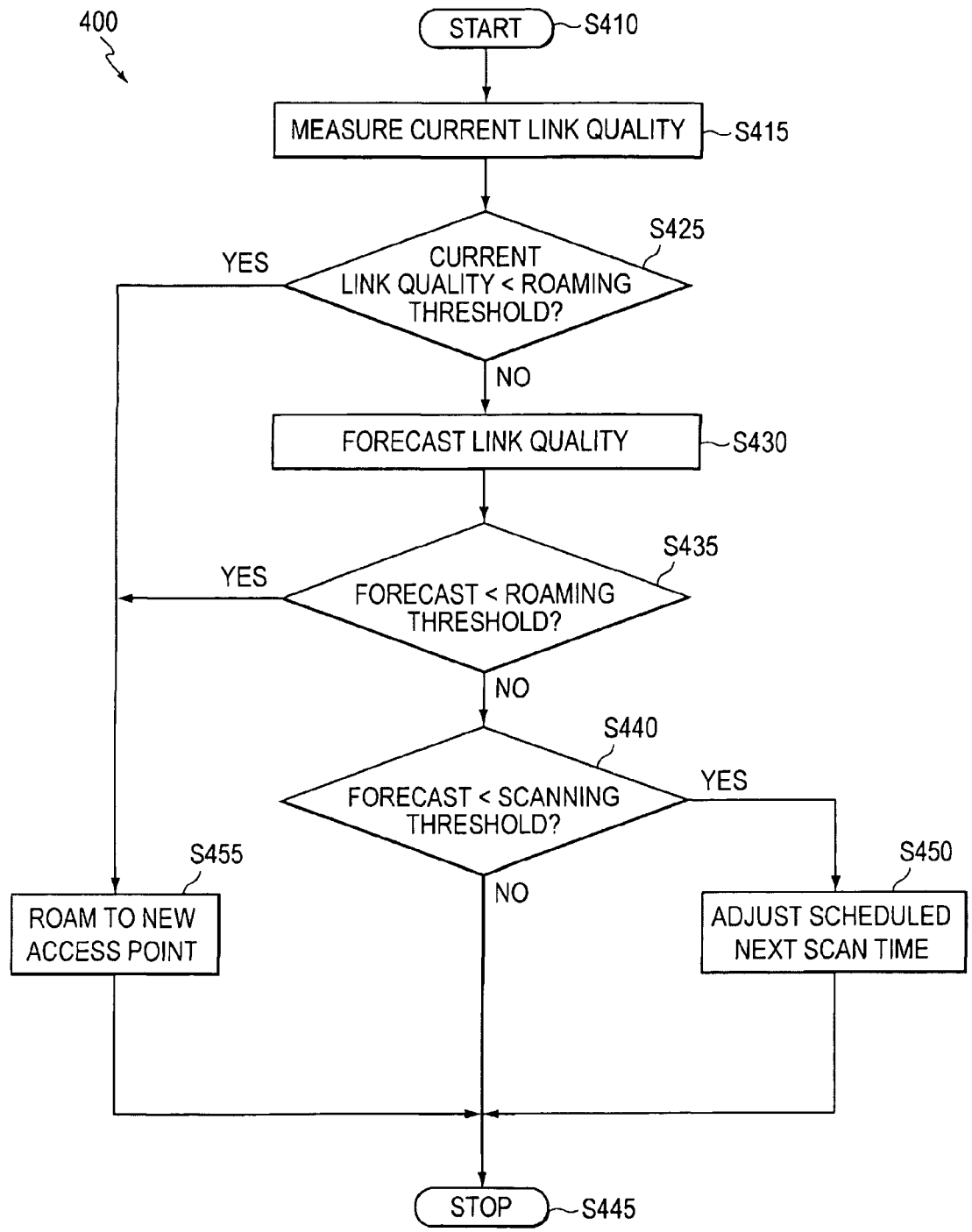
FIG. 4 shows a diagram of a flowchart for unilaterally predictive roaming in accordance with an embodiment.

FIG. 4 shows a diagram of a flowchart of predictive roaming 400 in an STA in accordance with an embodiment. The program can start at step S410 and can proceed to step S415. In program step S415, the current or presently used link quality can be assessed. The link quality may be measured using a metric such as RSSI, SNR, SIR, BER, and the like.

With respect to FIG. 4, it should be appreciated that the STA can switch to a new AP based on a sorted AP link quality database from a previous scan, such as a scan included in flowchart 500, step S515. For example, flowchart 500 may be executed periodically or before a communications session that includes high data rate reception.

It should be noted that the current link quality can include the RSSI of the currently addressed AP, such as an AP with a rank of one in the database. If the comparison in step S425 indicates that the current link quality is below the roaming threshold, then program flow can proceed to program step S455 in which a new AP can be selected. In other words, the new AP can be an AP to which the STA roams. If the comparison in program step S435 indicates that the current link quality is greater than or equal to the roaming threshold, then program flow can proceed to program step S430 in which the link quality can be forecasted to a future link quality.

Program step S430 can extrapolate, forecast, project or otherwise estimate a future link quality based on the current AP link quality measurements. The future link quality can be predicted by a linear extrapolator, a Kalman estimator, a polynomial model, an auto-regressive model, a linear predictive model, and the like. The future link quality can be extrapolated to a fixed or a variable future time. The future time can vary as a function of gradient or slope and a threshold. In other words, the future link quality can be adaptively predicted at time intervals given by an intercept time of the forecast and a threshold, such as roaming threshold 250, threshold_1 340, threshold_2 350, and the like. From program step S430, program flow can proceed to program step S435.

In program step S435, the future link quality can be compared with a roaming threshold, such as roaming threshold 250, threshold_2 350, and the like. If the predicted future link quality is less than the roaming threshold, then program flow can proceed to program step S455, where a new AP can be selected in advance of the link quality degrading to a level that would otherwise necessitate roaming because of a poor link. If the comparison in program step S435 indicates that the forecasted future link quality is greater than or equal to the roaming threshold, then program flow can proceed to program step S440.

In program step S440, the future link quality can be compared with a scanning threshold, such as threshold_1 340 described with respect to FIG. 3. If the future link quality is less than the scanning threshold, then program flow can proceed to program step S450 otherwise program flow can proceed to program step S445. When program flow proceeds to program step S450, the program can update a next scanning time of a background scan and perform a scan operation as necessary. In other words, when the forecast link quality is less than the scanning threshold, the program can modify the period or the frequency of subsequent scans and may reduce the time interval until the next scan. In program step S450, the updated or adjusted scanning schedule may be a function of the future or extrapolated link quality. For example, the scanning frequency can be adjusted based on a monotonic function of the future link quality. From program step S450, program flow can proceed to program step S445 where program execution can stop.

In accordance with an embodiment of the invention, flowchart 400 can be included in an interrupt or event driven program flow. For example, flowchart 400 can be executed when a processor clock indicates that a new link quality measurement and forecast are due.

Figures 5, 6:
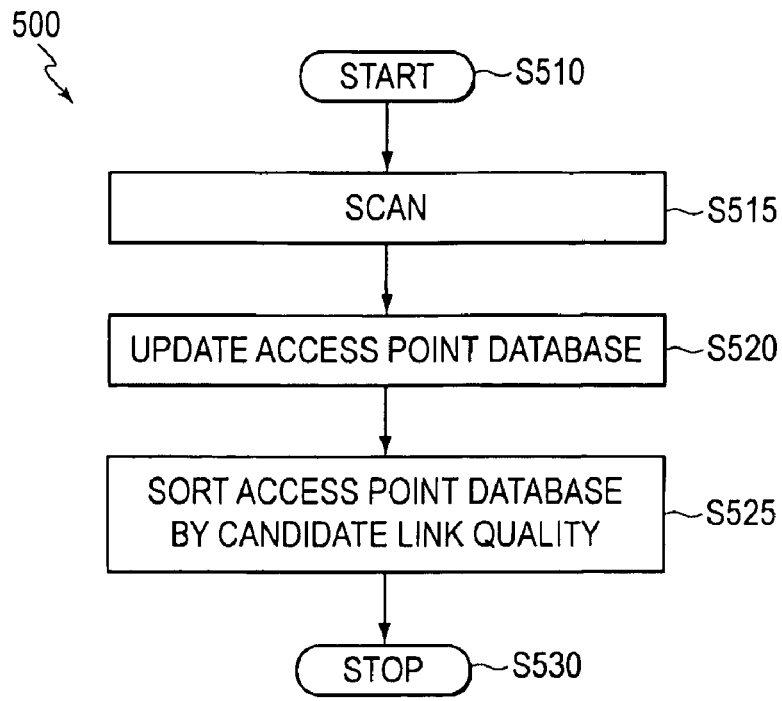
FIG. 5 shows a diagram of a flowchart for updating an access point (AP) database in accordance with an embodiment.
FIG. 6 shows a diagram of a data structure of an AP database for predictive roaming in accordance with an embodiment.

FIG. 5 shows a diagram of a flowchart for updating an AP database in accordance with an embodiment of the invention. The method can scan for candidate APs, update an AP database, and sort the database by the link quality of candidate APs. The flowchart can start at step S510 and can proceed to step S515 in which a RF environment from a WLAN can be scanned to search for candidate APs. The scan may include tuning a radio frequency receiver, selecting a pseudo-code used in a direct sequence spread spectrum demodulator, adjusting a frequency hopping schedule, and the like. A scan may take several seconds, for example, and may find one or more candidate AP. The candidate AP may include the current AP. The scan can occur on selected frequencies as determined by a code within a receiver such as the receiver 710a described with respect to FIG. 7.

From program step S515, the program can proceed to step S520 in which a database of candidate APs may be updated. The database can include an identifying number for a candidate AP found during the scan as shown, for example, by column 620 in FIG. 6. The database may also include link quality measurements for each AP in the database as shown, for example, by column 630 in FIG. 6.

From program step S520, program flow can proceed to program step S525 in which the AP database can be sorted by the link quality of each candidate AP. For example, the link quality values may be sorted according to link quality to find the maximum link quality. An AP with the highest link quality may be found and an identifier associated with that candidate AP may be used for subsequent demodulation and for subsequent downlinks. In other words, a candidate AP found during a scan may be selected as the AP that a client station will roam to or switch to for future downlink communications. The database may include a rank or sorted priority or number for each AP as shown, for example, by column 610 of FIG. 6. From program step S520, program flow can proceed to step S530 where program execution can stop.

FIG. 6 is a diagram of a suitable data structure for predictive roaming 600 in accordance with an embodiment. The database or data structure 600 can include an AP rank column 610, an AP identifier column 620, a link quality column 630, a first threshold 640, and a second threshold 650. The AP rank column 610 can enumerate available or candidate APs that an STA can receive signals from. The AP rank column 610 entries may be sorted in an order of desirability or suitability based on signal quality, LOS probability, aggregate throughput, and the like. The rank may be determined by corresponding entries in link quality column 630. For example, the current AP may be listed in data structure 600. For example, the current AP can be assigned a rank of one.

The AP identifier column 620 can include identifiers for candidate APs. The designators can include AP identifying numbers, AP direct sequence spread spectrum codes, AP decoding polynomials, AP frequency hopping code sequences, multi-user signal orthogonalizing codes, and the like.

The link quality column 630 can include a link quality score corresponding to each AP. For example, a current AP may have an AP column 610 rank of one as indicated by entry 612 and a link quality score 632 of 98%. The link quality column 630 entries can quantify link quality using RSSI, BER, SNR, SIR, and the like and may be expressed as ratios, percentages or other suitable determinate values.

FIG. 7 shows a diagram of a predictive roaming device 700 in accordance with an embodiment that includes a controller 705, an RF section 710, a link quality predictor 720, a threshold comparator 740, and a scan adjuster 750. The RF section 710, which may also be described as a wireless transceiver, can include, for example, a receiver 710a and a transmitter 710b. The controller 705 can be coupled to the RF section 710, the link quality predictor 720, the threshold comparator 740, and the scan adjuster 750. The controller 705 can include an access point switching module 705a. The RF section 710 can couple to the controller 705 and the link quality predictor 720. The link quality predictor 720 can include a link quality assessor 720a and a link quality forecaster 720b. The link quality predictor 720 can couple to the threshold comparator 740. The threshold comparator 740 can couple to the scan adjuster 750.

The controller 705 can activate the receiver 710a to receive a downlink signal from a WLAN AP. The RF section 710 can receive and downconvert the downlink signal. The receiver 710a can demodulate the downconverted downlink signal. The receiver 710a can also decode and send a data stream and a signal metric, such as RSSI, to the link quality predictor 720 and the controller 705.

The link quality assessor 720a in the link quality predictor 720 can determine a link quality metric for the downlink signal. For example, the link quality assessor 720a can process the signal from the RF section 710 to calculate signal quality metrics, such as statistical moments, average values of the link signal, signal to noise or interference ratios, and the like. The link quality assessor may process the signal metric from the RF section 710 or may combine the signal metric with internally calculated signal quality metrics to obtain a composite or overall link quality metric. The link quality assessor 720a may then transfer the link quality metric to the link quality forecaster 720b in the link quality predictor 720.

The downlink signal may vary in link quality, so the link quality assessor 720a may be configured to smooth past link quality metric and allow the link quality forecaster 720b to forecast future link quality metrics based on the smoothed past link quality metrics. Overall, for example, the link quality predictor 720 may forecast a future link quality from an average RSSI, SNR, BER, and other suitable signal performance metrics. The link quality predictor 720 may predict the future link quality from the downconverted downlink signal, the decoded data stream, or from signal quality measurement hardware in RF section 710, and the like.

The link quality predictor 720 can couple the predicted or future link quality to the threshold comparator 740. Threshold comparator 740 can compare the future link quality with a threshold. Threshold comparator 740 may compute a TTG based on the link quality measurements and a threshold, such as threshold_2 350. For example, the link quality estimator may determine that a threshold link quality, such as the threshold_2 350 may be crossed in at a time that precedes the next scheduled link quality measurement from the current AP.

The threshold comparator 740 can apply a single threshold, a set of thresholds, or other decision rules to the future link quality from link quality predictor 720. The decision thresholds can be determined using a statistical approach that minimizes the probability of false alarm or Type I error for a given probability of missed detection or Type II error. Threshold comparator 740 may be configured with the threshold or set of thresholds by controller 705. The thresholds may be specific to a given AP. The controller 705 can vary the thresholds dynamically or adaptively. In other words, the controller 705 may configure the RF section 710 to scan for APs, record the available APs in a database, and initialize threshold comparator 740 with one or more thresholds for each AP. The thresholds for each AP can be a function of the AP identifier 620, for example.

Threshold comparator 740 can send one or more comparison result to scan adjuster 750. In other words, scan adjuster 750 can receive a single or multiple comparison results. For example, the threshold comparator can compute a TTG for which the link quality prediction reaches a scanning threshold and a second TTG for which the link quality prediction reaches the roaming threshold.

In accordance with an embodiment, the link quality predictor 720 and threshold comparator 740 can calculate multiple link quality estimates and apply multiple threshold comparisons. For example, link quality predictor 720 may include a near instantaneous, a short-term, and a long-term prediction. The short and long-term predictions may be based on regressions using multiple measurements. Threshold comparator 740 can compare the short-term future link quality to a short-term threshold, such as threshold_2 350 and compare a long-term future link quality to a long-term threshold, such as threshold_1 340. Threshold comparator 740 may apply a composite decision rule that combines the short-term and long-term future link quality estimates.

Scan adjuster 750 can update the next scan time based on the threshold comparator 740 comparison result or the future link quality from link quality predictor 720. In other words, both soft and hard decision metrics and rules may be used to update the next scan time from scan adjuster 750.

Scan adjuster 750 can apply a transformation to the future link quality and the comparison results from threshold comparator 740. For example, the scan adjuster 750 can increase the time between scans in proportion to, or as an increasing monotonic function of, the future link quality.

It is noted that the threshold comparator 740 and scan adjuster 750 may be combined into a composite unit that communicates with the controller 705. For example, such a composite unit can apply statistical decision-making rules that minimize the probability of that the access point switching module 705a of the controller 705 may incorrectly switch to a new AP. The composite unit could apply statistical process control rules such as upper control #1, lower control limits, and the like based on future link quality and may signal the results of applying the process control rules to the access point switching module 705a. The controller 705 may update internal tables of access points, such as the AP rank 610, shown with respect to FIG. 6, reconfigure the RF section 710 to demodulate and decode signals from a newly selected access point, and perform other actions to effect roaming to the newly selected access point based on the past and forecasted link quality While the invention has been described in conjunction with the specific embodiments thereof, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A user equipment for use in a wireless computer network having a plurality of wireless access points, comprising:
   a wireless transceiver that is configured to communicate with the wireless computer network through a first selected wireless access point;
   a link quality assessor, coupled to the wireless transceiver, that is configured to assess the quality of a communication link between the wireless transceiver and the first selected wireless access point;
   a link quality forecaster, coupled to the link quality assessor, that is configured to forecast a predicted future quality of the communication link as a function of past quality of the communication link; and
   an access point switching module, coupled to the link quality forecaster, that is configured to initiate an access point scan to determine a second selected wireless access point for communication with the wireless computer network in response to the predicted future quality falling below a scanning threshold but greater than a roaming threshold, and that is configured to select a new access point when the predicted future quality is less than the roaming threshold.

2. The user equipment of claim 1, wherein the link quality forecaster is further configured to indicate a trend of predicted future link quality to the switching module.

3. The user equipment of claim 2, wherein the trend of predicted future link quality is at least one of a linear extrapolation, a polynomial extrapolation, an autoregressive model, an autoregressive-moving average model, a linear predictive model, and a propagated state variable model.

4. The user equipment of claim 2, wherein the link quality forecaster is further configured to adjust a future time based on a rate of change of link quality.

5. The user equipment of claim 2, wherein when the trend of the predicted future link quality indicates the predicted future quality is substantially constant, the switching module delays scanning for wireless access points.

6. The user equipment of claim 2, wherein when the trend of predicted future link quality changes more rapidly than a predetermined degradation rate, the switching module scans for new wireless access points.

7. A method for roaming in a wireless computer network having a plurality of wireless access points, the method comprising:
communicating with the computer network through a first selected wireless access point;
assessing a quality of a communication link between a wireless transceiver and the first selected wireless access point;
forecasting a predicted future quality of the communication link as a function of past quality of the communication link;
scanning the plurality of wireless access points to identify a second selected wireless access point for communication with the computer network in response to the predicted future quality falling below a scanning threshold but greater than a roaming threshold; and
selecting a new access point when the predicted future quality is less than the roaming threshold.

8. The method of claim 7, further comprising calculating a trend of predicted future link quality and sending the trend of predicted future link quality to a switching module.

9. The method of claim 8, wherein the trend of predicted future link quality is at least one of a linear extrapolation, a polynomial extrapolation, an autoregressive model, an autoregressive-moving average model, a linear predictive model, and a propagated state variable model.

10. The method of claim 8, wherein when the trend of the predicted future link quality indicates the predicted future quality is substantially constant, the switching module delays scanning for wireless access points.

11. The method of claim 10, wherein when the trend of predicted future link quality changes more rapidly than a predetermined degradation rate, the switching module scans for new wireless access points.

12. A method for roaming by a client station of a wireless local area network (WLAN), the method comprising:
measuring a plurality of link quality values of a downlink signal received by the client station from a first wireless access point of the WLAN;
predicting a predicted future link quality using a predictor in the client station that bases the predicted future link quality on the plurality of measured link quality values; and
switching to a second access point, based on the predicted future link quality, wherein predicting the predicted future link quality includes calculating an intercept time at which the predicted future link quality substantially equals at least one of a scanning threshold and a roaming threshold.

13. The method of claim 12, further comprising:
scanning to find a plurality of candidate access points when the predicted future link quality is less than or equal to the scanning threshold.

14. The method of claim 13, further comprising:
adjusting a next scheduled scan time based on the predicted future link quality.

15. The method of claim 14, further comprising:
storing a measured link quality and a corresponding access point identifier in a database.

16. The method of claim 15, wherein switching to a second access point based on the predicted future link quality comprises:
selecting the second access point from the database based on the measured link quality; and
demodulating the downlink signal from the second access point instead of the first access point.

17. The method of claim 14, wherein the next scheduled scan time is a monotone increasing function of the predicted future link quality.

18. The method of claim 12, wherein predicting the predicted future link quality includes at least one of extrapolating a linear model, a polynomial model, a Kalman estimator, an auto-regressive model, and a linear predictive model.

19. The method of claim 12, wherein, when the intercept time is less than ten (10) seconds, the client station scans for candidate access points.

20. The method of claim 12, wherein, when the intercept time is less than two (2) seconds, the client station switches to the second access point before scanning.

21. The method of claim 20, wherein the client station selects the second access point from a database of candidate access points.

22. A method for roaming by a client station in a wireless local area network (WLAN) the method comprising:
scanning for an access point in the WLAN;
updating an access point database with a measured link quality for each access point found in the scan;
predicting the link quality of the access point to a future time;
selecting a new access point when the predicted future link quality is less than a roaming threshold; and
adjusting a next scan time when the predicted future link quality is less than a scanning threshold but greater than the roaming threshold.

23. The method of claim 22 wherein adjusting the next scan time includes calculating the next scan time based on a monotone function of the predicted future link quality.

24. The method of claim 22 wherein predicting the link quality includes at least one of linear extrapolation, polynomial extrapolation, propagation of a Kalman model, extrapolation of an auto-regressive model, extrapolation of a linear predictive code model.

25. A client station in a wireless local area network (WLAN), the client station comprising:
a radio frequency (RF) receiver that is configured to communicate with a first access point of the WLAN and measure a first plurality of link quality values of downlinked signals;
a link quality predictor, coupled to the RF receiver, that is configured to forecast a predicted future link quality based on the first plurality of link quality values;
a threshold comparator, coupled to the link quality predictor, that is configured to compare the predicted future link quality with a scanning threshold and a roaming threshold less than the scanning threshold;
a scan adjuster, coupled to the threshold comparator, that is configured to delay a scheduled scan time when the predicted future link quality is above the scanning threshold and accelerate the scheduled scan time when the predicted future link quality is below the scanning threshold but above the roaming threshold; and a controller, coupled to the scan adjuster, that is configured to command the receiver to switch to a second access point when at least one of the predicted future link quality and at least one of the first plurality of is less than or equal to the roaming threshold.

26. The client station of claim 25, wherein:
the controller causes the receiver to scan for a plurality of candidate access points when the scheduled scan is due.

27. The client station of claim 26, wherein the controller causes the receiver to scan for a plurality of candidate access points when the scheduled scan is due and stores a measured link quality and a corresponding access point identifier in a database.

28. The client station of claim 27, wherein the client station selects the second access point from a database of candidate access points.

29. The client station of claim 25, wherein the link quality predictor predicts the predicted future link quality based on extrapolating at least one of a linear model, a polynomial model, a Kalman estimator, an auto-regressive model, and a linear predictive model to a future time.

30. The client station of claim 25, wherein the link quality predictor extrapolates at least one of a linear model, a polynomial model, a Kalman estimator, an auto-regressive model, and a linear predictive model to an intercept time at which the predicted future link quality substantially equals at least one of a scanning threshold and a roaming threshold.

31. The client station of claim 30, wherein, when the intercept time is less than ten (10) seconds, the client station scans for candidate access points.

32. The client station of claim 31, wherein, when the intercept time is less than two (2) seconds, the client station switches to the second access point before scanning.

33. The client station of claim 25, wherein the scan adjuster adjusts the scheduled scan time based on a monotone increasing function of the predicted future link quality.

34. The client station of claim 25, wherein the first plurality of link quality values includes at least one of a received signal strength indication, a link signal-to-noise ratio, a link signal-to-interference ratio, and a link bit error rate.

35. A client station in a wireless local area network (WLAN), comprising:
a radio frequency (RF) receiver that is configured to communicate with a first access point of the WLAN and to measure a first plurality of link quality values of downlink signals from the first access point;
a link quality predictor, coupled to the RF receiver, that is configured to forecast a predicted future link quality based on the first plurality of link quality values;
a scanning adjuster that is operative to adjust a period for executing a next scan for other access points based on the predicted future link quality; and
an access point switching module, coupled to the link quality predictor, that is configured to initiate an access point scan to determine a second selected wireless access point for communication with the WLAN in response to the predicted future quality falling below a scanning threshold but greater than a roaming threshold, and that is configured to select a new access point when the predicted future quality is less than the roaming threshold.

36. A client station in a wireless local area network (WLAN), comprising:
a radio frequency (RF) receiver that is configured to communicate with a first access point of the WLAN and to measure a first plurality of link quality values of downlink signals from the first access point;
a link quality predictor, coupled to the RF receiver, that is configured to forecast a predicted future link quality based on the first plurality of link quality values;
a scanning adjuster that is operative to adjust a period for roaming to a second access point that is different from the first access point based on the predicted future link quality; and
an access point switching module, coupled to the link quality predictor, that is configured to initiate an access point scan to determine a second selected wireless access point for communication with the WLAN in response to the predicted future quality falling below a scanning threshold but greater than a roaming threshold, and that is configured to select a new access point when the predicted future quality is less than the roaming threshold.

37. A user equipment for use in a wireless computer network having a plurality of wireless access points, comprising:
a wireless transceiver that is configured to communicate with the computer network through a first wireless access point;
a link quality assessor, coupled to the wireless transceiver, that is configured to assess the quality of a communication link between the wireless transceiver and the first wireless access point;
a link quality forecaster, coupled to the link quality assessor, that is configured to forecast a predicted future quality of the communication link as a function of past quality of the communication link; and
an access point switching module, coupled to the link quality forecaster, that is configured to switch to a second wireless access point in response to the predicted future quality falling below a roaming threshold that is less than a scanning threshold, and that is configured to initiate an access point scan to determine the second wireless access point in response to the predicted future quality falling below the scanning threshold but greater than the roaming threshold.

38. A method for roaming in a wireless computer network having a plurality of wireless access points, the method comprising:
communicating with the wireless computer network through a first wireless access point;
assessing a quality of a communication link between a wireless transceiver and the first wireless access point;
forecasting a predicted future quality of the communication link as a function of past quality of the communication link;
switching to a second wireless access point in response to the predicted future quality falling below a roaming threshold that is less than a scanning threshold; and
scanning the plurality of wireless access points to identify the second wireless access point in response to the predicted future quality falling below the scanning threshold but greater than the roaming threshold.

* * * * *